US009823726B2

(12) United States Patent
Park et al.

(10) Patent No.: US 9,823,726 B2
(45) Date of Patent: Nov. 21, 2017

(54) APPARATUS AND METHOD FOR REDUCING POWER CONSUMPTION CAUSED BY COMMUNICATION BETWEEN PROCESSORS IN PORTABLE TERMINAL

(71) Applicant: Samsung Electronics Co., Ltd., Suwon-si, Gyeonggi-do (KR)

(72) Inventors: Kwang-Jin Park, Suwon-si (KR); Hong Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 14/555,960

(22) Filed: Nov. 28, 2014

(65) Prior Publication Data

US 2015/0089268 A1 Mar. 26, 2015

Related U.S. Application Data

(63) Continuation of application No. 13/070,932, filed on Mar. 24, 2011, now Pat. No. 8,904,219.

(30) Foreign Application Priority Data

Apr. 26, 2010 (KR) .................. 10-2010-0038295

(51) Int. Cl.
*G06F 1/00* (2006.01)
*G06F 1/32* (2006.01)

(52) U.S. Cl.
CPC .......... *G06F 1/3218* (2013.01); *G06F 1/3203* (2013.01); *G06F 1/3253* (2013.01); *Y02B 60/1235* (2013.01)

(58) Field of Classification Search
CPC .... G06F 1/3203; G06F 1/3218; G06F 1/3253; Y02B 60/1235
See application file for complete search history.

(56) References Cited

U.S. PATENT DOCUMENTS

| 5,471,621 | A | 11/1995 | Ohtsuki |
| 7,607,031 | B2 | 10/2009 | Mackey et al. |
| 2002/0087748 | A1 | 7/2002 | Park et al. |
| 2004/0225901 | A1 | 11/2004 | Bear et al. |
| 2007/0085822 | A1 | 4/2007 | Lagnado |
| 2008/0162950 | A1* | 7/2008 | Brown .................. G06F 1/3203 713/300 |

(Continued)

FOREIGN PATENT DOCUMENTS

| JP | 04-333119 A | 11/1992 |
| JP | 2010044732 A * | 2/2010 |

(Continued)

*Primary Examiner* — Austin Hicks
(74) *Attorney, Agent, or Firm* — Jefferson IP Law, LLP (57) ABSTRACT

An apparatus and method for reducing power consumption in a portable terminal are provided. The apparatus includes a display unit for displaying at least one indicator that indicates status information measured by a slave processor, a master processor for controlling one of ON and OFF of the display unit and for providing image data to the display unit, and the slave processor for transmitting to the master processor indicator update information for updating the at least one indicator, wherein transmission to the master processor of the indicator update information is discontinued if the status of the display unit is OFF.

18 Claims, 3 Drawing Sheets

(56) References Cited

U.S. PATENT DOCUMENTS

2010/0088532 A1* 4/2010 Pollock ................ G06F 1/1626
                                                 713/324
2010/0115433 A1   5/2010 Lee et al.
2010/0174760 A1* 7/2010 Longobardi ......... G06Q 10/109
                                                 707/807

FOREIGN PATENT DOCUMENTS

KR       2002-0056306 A     7/2002
KR       10-2004-0095163 A  11/2004
KR       10-2008-0070365 A  7/2008

* cited by examiner

APPARATUS AND METHOD FOR REDUCING POWER CONSUMPTION CAUSED BY COMMUNICATION BETWEEN PROCESSORS IN PORTABLE TERMINAL

PRIORITY

This application is a continuation application of a prior application Ser. No. 13/070,932, filed on Mar. 24, 2011, which claimed the benefit under 35 U.S.C. §119(a) of a Korean patent application filed in the Korean Intellectual Property Office on Apr. 26, 2010 and assigned Serial No. 10-2010-0038295, the entire disclosure of which is hereby incorporated by reference.

BACKGROUND OF THE INVENTION

1. Field of the Invention

The present invention relates to a portable terminal. More particularly, the present invention relates to an apparatus and method for reducing power consumption caused by communication between processors in the portable terminal.

2. Description of the Related Art

Portable terminals have been rapidly adopted due to their convenience and have become essential tools of modern life. The rapid rate of adoption is at least partly due to service providers and terminal manufacturers providing additional functions to increase the utility of the portable terminals.

The increase in the additional functions and the improvement of the portable terminal has resulted in an increase of a computational amount to be processed in the portable terminal. As a result, a portable terminal employing two or more processors has been introduced. In this case, information displayed on a display unit of the portable terminal is controlled by one processor. Accordingly, among status information displayed on the display unit, information generated by another processor is delivered to the processor for controlling the display unit through communication between the processors. The processor for controlling the display unit then generates image data for displaying an indicator that indicates the status information. The display unit then displays the indicator according to the image data. For example, the indicator may be an antenna bar that indicates received signal strength.

In general, the display unit of the portable terminal is not always in an ON status, and is turned off when there is no key input for a specific time period. When the display unit is in an OFF status, there is no need to generate the image data for displaying the indicator that indicates the status information such as the antenna bar. However, the status information is delivered to the processor for controlling the display unit irrespective of the ON/OFF status of the display unit. Accordingly, power is unnecessarily wasted due to unnecessary communication between the processors.

SUMMARY OF THE INVENTION

An aspect of the present invention is to address at least the above-mentioned problems and/or disadvantages and to provide at least the advantages described below. Accordingly, an aspect of the present invention is to provide an apparatus and method for avoiding unnecessary power consumption in a portable terminal.

Another aspect of the present invention is to provide an apparatus and method for reducing power consumption caused by unnecessary communication between processors in a portable terminal.

Another aspect of the present invention is to provide an apparatus and method for determining whether indicator information is transmitted between processors according to a status of a display unit in a portable terminal.

In accordance with an aspect of the present invention, an apparatus for operating a portable terminal is provided. The apparatus includes a display unit for displaying at least one indicator that indicates status information measured by a slave processor, a master processor for controlling one of ON and OFF of the display unit and for providing image data to the display unit, and the slave processor for transmitting to the master processor indicator update information for updating the at least one indicator, wherein transmission to the master processor of the indicator update information is discontinued if the status of the display unit is OFF.

In accordance with another aspect of the present invention, a method of operating a portable terminal is provided. The method includes determining whether a display unit is one of ON and OFF, and transmitting to a master processor indicator update information for updating at least one indicator for indicating status information measured by a slave processor, wherein transmission to the master processor of the indicator update information is discontinued if the status of the display unit is OFF.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present invention described below relates to a technique for reducing power consumption caused by unnecessary communication between processors in a portable terminal. Hereinafter, the portable terminal includes a cellular telephone, a personal mobile telephone, a complex wireless terminal, an International Mobile Telecommunications-2000 (IMT-2000) terminal, etc.

In exemplary embodiments of the present invention, the portable terminal includes two or more processors, and includes at least one display element. In this case, the display element displays at least one indicator, and the display element for displaying the indicator is controlled by a first processor. Therefore, if a second processor for measuring or generating information represented by the indicator does not control the display element, the second processor provides the information to the first processor for controlling the display element. For convenience of explanation, the first processor for controlling the display element is referred to as a 'master processor, and the second processor for providing the information represented by the indicator is referred to as a 'slave processor'.

Detailed examples of the mater processor and the slave processor may vary depending on a characteristic of the portable terminal. For example, in a case of a portable terminal accessible to a plurality of networks, the master processor may be a processor for communication of a first network, and the slave processor may be a processor for communication of a second network. Alternatively, in a case of a portable terminal accessible only to one network, the master processor may be a processor that controls a Man to Machine Interface (MMI) processing function and the slave processor may be a processor that controls a communication control function.

A communication process between the master processor and the slave processor according to exemplary embodiments of the present invention will now be described. Hereinafter, for convenience in explanation, exemplary embodiments of the present invention are described in the context of a case where an antenna bar is indicated, as an example of an indicator. However, the present invention is not limited thereto and may equally apply to a case where an indicator other than the antenna bar is used. For example, the different indicator may be an indicator for indicating a registration status such as a Short Message Service Cell Broadcast (SMSCB), an accessed network type, an access status, a service availability status, etc. Herein, the SMSCB includes information which is broadcast non-periodically to users by a network provider, and particular contents of the information vary according to an intention of the provider. For example, information provided through the SMSCB may be news, weather, a user's current location, etc.

When the display element is turned off due to the portable terminal entering a standby state or the like, the master processor notifies the slave processor that a status of the display element is switched to OFF. Thereafter, when the display element is turned on due to the portable terminal exiting the standby state or the like, the master processor notifies the display element that the status of the display element is switched to ON.

The slave processor persistently performs Radio Frequency (RF) measurement, and generates information for antenna bar update by considering a result of the RF measurement. In this case, an update event may be defined differently according to a particular implementation of the present invention. For example, the update event may be defined such that the indicator update event is performed according to a specific period or is performed when the indicator needs to change according to the measurement result.

Upon generating the information for antenna bar update, the slave processor determines whether transmission is necessary according to the status of the display element before transmission of the information for the antenna bar update. That is, the slave processor does not transmit the antenna bar update information if the status of the display element is OFF. In addition, at the occurrence of the update event, the slave processor transmits the antenna bar update information by considering a current RF status when it is notified from the master processor that the status of the display element is switched to ON.

A detailed operation of the slave processor for transmitting the antenna bar update information is as follows. When it is notified that the status of the display element is switched to ON in a situation where an initial status of the display element is OFF, the slave processor sets PRE_STATUS, which indicates a previous status of the display element, to ON, and transmits the antenna bar update information. Subsequently, before it is notified that the status of the display element is switched to OFF, the slave processor transmits the antenna bar update information according to the update event. In this case, when it is notified that the status of the display element is switched to OFF, the slave processor sets the PRE_STATUS to OFF, and does not transmit the antenna bar update information. Thereafter, when it is notified that the status of the display element is switched to ON, the slave processor sets the PRE_STATUS to ON, transmits the antenna bar update information irrespective of the update event, and then transmits the antenna bar update information according to the update event.

In summary, if the slave processor is notified that the status of the display element is switched to ON when the PRE_STATUS is not set, or if the slave processor is notified that the status of the display element is switched to ON when the PRE_STATUS is set to OFF, the slave processor transmits the antenna bar update information. In addition, when the slave processor is notified that the status of the display element is switched to OFF irrespective of what the PRE_STATUS is set to, the slave processor discontinues the transmission of the antenna bar update information.

Hereinafter, a structure and operation of a portable terminal for controlling communication between processors will be described with reference to the accompanying drawings.

Figure 1:
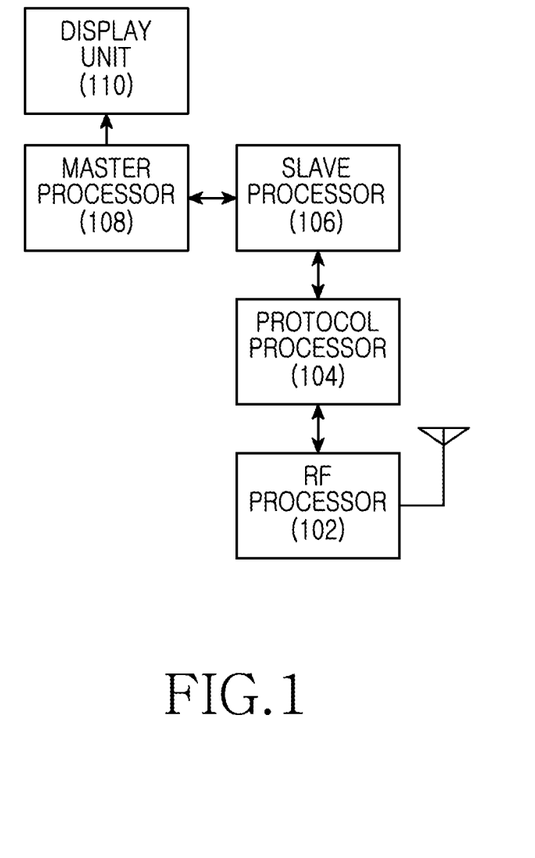
FIG. 1 is a block diagram illustrating a structure of a portable terminal according to an exemplary embodiment of the present invention.

FIG. 1 is a block diagram illustrating a structure of a portable terminal according to an exemplary embodiment of the present invention. The structure of FIG. 1 is based on a case where the portable terminal is accessible to only one network.

Referring to FIG. 1, the portable terminal includes an RF processor 102, a protocol processor 104, a display unit 106, a master processor 108, and a slave processor 110.

The RF processor 102 transmits and receives a signal through a radio channel by using signal band conversion, amplification, etc. That is, the RF processor 102 up-converts a baseband signal provided from the protocol processor 104 into an RF signal and then transmits the RF signal through an antenna. Further, the RF processor 102 down-converts an RF signal received through the antenna into a baseband signal.

The protocol processor 104 performs conversion between the baseband signal and a bit-stream according to a physical-layer protocol of a system. For example, at data transmission, the protocol processor 104 converts a transmission (Tx) bit-stream into a Tx signal according to a communication protocol. In addition, at data reception, the protocol processor 104 restores a reception (Rx) bit-stream according to the communication protocol from the baseband signal provided from the RF processor 102.

The display unit 106 displays status information, which is generated while the portable terminal operates, and also displays alphanumeric characters, images, and the like which are produced when an application program is executed. That is, the display unit 106 displays image data provided from the master processor 108 on a visual screen. In particular, according to the image data that indicates at least one indicator provided from the master processor 108, the display unit 106 displays the at least one indicator. Herein, the indicator implies a character, graphic, icon, etc., that indicates a status of the portable terminal. For example, the indicator may be an antenna bar, an SMSCB, an accessed network type, an access status, a service availability status, etc. For example, the display unit 106 may be a Liquid Crystal Display (LCD), an Organic Light-Emitting Diode (OLED), etc.

The master processor 108 and the slave processor 110 provide overall control of the portable terminal. The master processor 108 does not control a communication control function, but does control an MMI processing function for controlling the display unit 106. The slave processor 110 does not control the MMI processing function, but does control a communication control function for controlling the protocol processor 104. Herein, the master processor 108 may control additional functions of the portable terminal, except for the communication control such as application program processing, sound reproduction, etc.

The master processor 108 provides the image data to the display unit 106, and controls a status of the display unit 106. That is, the master processor 108 controls ON/OFF of the display unit 106. For example, if a user places the portable terminal in a standby state or there is no key input for a specific time period, the master processor 108 controls the display unit 106 to be switched to an OFF status. In addition, if the user causes the portable terminal to exit the standby state or key input occurs in the OFF status, the master processor 108 controls the display unit 106 to be switched to an ON status. Further, when the status of the display unit 106 is switched, the master processor 108 notifies the slave processor 110 that the status of the display unit 106 is switched to a corresponding one of ON and OFF.

The slave processor 110 measures status information indicated by the at least one indicator, generates indicator update information by considering a measurement result, and transmits the indicator update information to the master processor 108. For example, if the indicator is the antenna bar, the slave processor 110 persistently performs RF measurement by using the protocol processor 104, and generates antenna bar update information by considering the RF measurement result. In this case, the slave processor 110 determines whether to deliver the indicator update information according to the status of the display unit 106 upon receiving the notification on the status from the master processor 108. In other words, the slave processor 110 delivers the indicator update information when the display unit 106 is switched from OFF to ON and when an update event occurs in a status where the display unit 106 is ON.

More specifically, when it is notified that the status of the display unit 106 is switched to ON, the slave processor 110 sets PRE_STATUS to ON, and transmits the indicator update information. Herein, the PRE_STATUS is a parameter that indicates the status of the display unit 106 the last time the indicator update information was transmitted or the last time transmission was attempted. Subsequently, until it is notified that the status of the display unit 106 is switched to OFF, the slave processor 110 transmits the indicator update information according to the update event. In this case, if it is notified that the status of the display unit 106 is switched to OFF, the slave processor 110 sets the PRE_STATUS to OFF, and does not transmit the indicator update information. Thereafter, if it is notified that the status of the display unit 106 is switched to ON, the slave processor 110 sets the PRE_STATUS to ON, transmits the indicator update information irrespective of the update event, and then transmits the indicator update information according to the update event.

Figure 2:
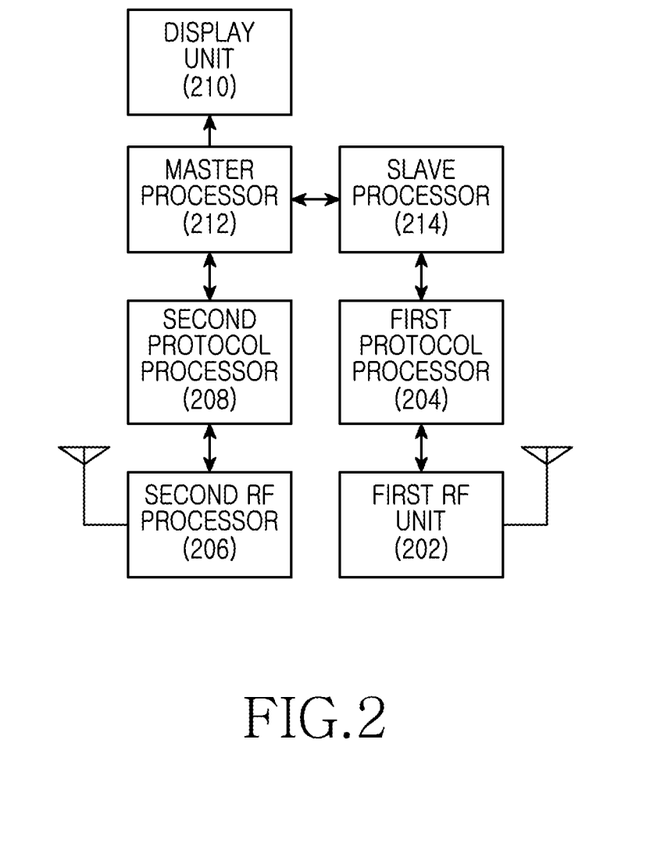
FIG. 2 is a block diagram illustrating a structure of a portable terminal according to an exemplary embodiment of the present invention.

FIG. 2 is a block diagram illustrating a structure of a portable terminal according to an exemplary embodiment of the present invention. The structure of FIG. 2 is based on a case where the portable terminal is accessible to two networks.

Referring to FIG. 2, the portable terminal includes a first RF unit 202, a first protocol processor 204, a second RF processor 206, a second protocol processor 208, a display unit 210, a master processor 212, and a slave processor 214.

The first RF unit 202 transmits and receives a signal through a radio channel by using signal band conversion, amplification, etc. That is, the first RF unit 202 up-converts a baseband signal provided from the first protocol processor 204 into an RF signal and then transmits the RF signal through an antenna. Further, the first RF unit 202 down-converts an RF signal received through the antenna into a baseband signal.

The first protocol processor 204 performs conversion between the baseband signal and a bit-stream according to a physical-layer protocol of a system. For example, at data transmission, the first protocol processor 204 converts a Tx bit-stream into a Tx signal according to a first communication protocol. In addition, at data reception, the first protocol processor 204 restores an Rx bit-stream according to the first communication protocol from the baseband signal provided from the first RF unit 202.

The second RF processor 206 transmits and receives a signal through a radio channel by using signal band conversion, amplification, etc. That is, the second RF processor 206 up-converts a baseband signal provided from the second protocol processor 208 into an RF signal and then transmits the RF signal through an antenna. Further, the second RF processor 206 down-converts an RF signal received through the antenna into a baseband signal.

The second protocol processor 208 performs conversion between the baseband signal and a bit-stream according to the physical-layer protocol of the system. For example, at data transmission, the second protocol processor 208 converts a Tx bit-stream into a Tx signal according to a second communication protocol. In addition, at data reception, the second protocol processor 208 restores an Rx bit-stream according to the second communication protocol from the baseband signal provided from the second RF processor 206.

The display unit 210 displays status information, which is generated while the portable terminal operates, and also displays alphanumeric characters, images, and the like which are produced when an application program is executed. That is, the display unit 210 displays image data provided from the master processor 212 on a visual screen. In particular, according to the image data that indicates at least one indicator provided from the master processor 212, the display unit 210 displays the at least one indicator. Herein, the indicator implies a character, graphic, icon, etc., that indicates a status of the portable terminal. For example, the indicator may be an antenna bar, an SMSCB, an accessed network type, an access status, a service availability status, etc. For example, the display unit 210 may be an LCD, an OLED, etc.

The master processor 212 and the slave processor 214 provide overall control to the portable terminal. The master processor 212 controls an MMI processing function for controlling the display unit 210, and controls communication conforming to the second communication protocol. The slave processor 214 does not control the MMI processing function, and controls communication conforming to the first communication protocol. Herein, the master processor 212 may control additional functions of the portable terminal, except for the communication control such as application program processing, sound reproduction, etc.

The master processor 212 provides the image data to the display unit 210, and controls a status of the display unit 210. That is, the master processor 212 controls ON/OFF of the display unit 210. For example, if a user causes the portable terminal to enter a standby state or there is no key input for a specific time period, the master processor 212 controls the display unit 210 to be switched to an OFF status. In addition, if the user causes the portable terminal to exit the standby state or key input occurs in the OFF status, the master processor 212 controls the display unit 210 to be switched to an ON status. Further, when the status of the display unit 210 is switched, the master processor 212 notifies the slave processor 214 that the status of the display unit 210 is switched to ON or OFF.

The slave processor 214 measures status information indicated by the at least one indicator, generates indicator update information by considering a measurement result, and transmits the indicator update information to the master processor 212. For example, if the indicator is the antenna bar, the slave processor 214 persistently performs RF measurement by the use of the first protocol processor 204, and generates antenna bar update information by considering the RF measurement result. In this case, the slave processor 214 determines whether to deliver the indicator update information according to the status of the display unit 210 upon receiving the notification on the status from the master processor 212. In other words, the slave processor 214 delivers the indicator update information when the display unit 210 is switched from OFF to ON and when an update event occurs in a status where the display unit 210 is ON.

More specifically, when it is notified that the status of the display unit 210 is switched to ON, the slave processor 214 sets PRE_STATUS to ON, and transmits the indicator update information. Herein, the PRE_STATUS is a parameter that indicates the status of the display unit 210 the last time the indicator update information was transmitted or at the latest time transmission was attempted. Subsequently, until it is notified that the status of the display unit 210 is switched to OFF, the slave processor 214 transmits the indicator update information according to the update event. In this case, if it is notified that the status of the display unit 210 is switched to OFF, the slave processor 214 sets the PRE_STATUS to OFF, and does not transmit the indicator update information. Thereafter, if it is notified that the status of the display unit 210 is switched to ON, the slave processor 214 sets the PRE_STATUS to ON, transmits the indicator update information irrespective of the update event, and then transmits the indicator update information according to the update event.

Figure 3:
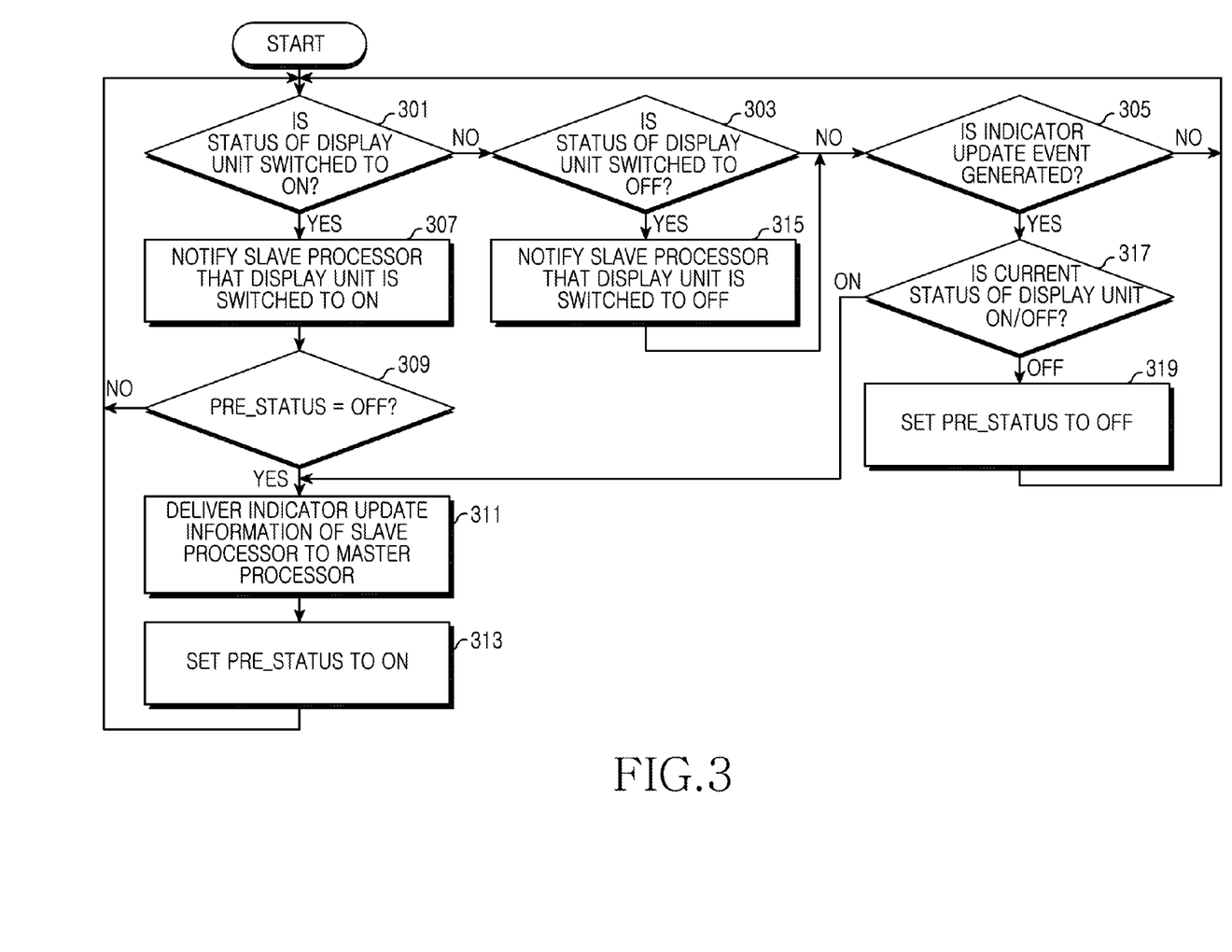
FIG. 3 is a flowchart illustrating a process of transmitting and receiving indicator update information between processors in a portable terminal according to an exemplary embodiment of the present invention.

FIG. 3 is a flowchart illustrating a process of transmitting and receiving indicator update information between processors in a portable terminal according to an exemplary embodiment of the present invention.

Referring to FIG. 3, the portable terminal determines whether a status of a display unit is switched to ON in step 301. Herein, the status of the display unit is switched under the control of a master processor. For example, the display unit is switched to an ON status when a user causes the portable terminal to exit a standby state or when a key input occurs in an OFF status.

If the status of the display unit is not switched to the ON status, proceeding to step 303, the portable terminal determines whether the status of the display unit is switched to the OFF status. Herein, the display unit is switched under the control of the master processor. For example, the display unit is switched to the OFF status when the user causes the portable terminal to enter a standby state or when there is no key input during a specific time period.

If the status of the display unit is not switched to the OFF status, proceeding to step 305, the portable terminal determines whether an indicator update event occurs for information measured by a slave processor. The update event may be defined differently according to a particular implementation of the present invention. For example, it may be defined such that the indicator update event is performed according to a specific period or is performed when the indicator needs to change according to the measurement result.

That is, the portable terminal persistently monitors whether the status of the display unit is switched or the indicator update event occurs through step 301, step 303, and step 305.

If the status of the display unit is switched to the ON status in step 301, proceeding to step 307, the portable terminal notifies the slave processor that the status of the display unit is switched to the ON status. Herein, the notification is performed by the master processor.

In step 309, the portable terminal determines whether the display unit's PRE_STATUS stored in the slave processor is set to OFF. If the PRE_STATUS is not set to OFF, the procedure returns to step 301.

Otherwise, if the PRE_STATUS is set to OFF, proceeding to step 311, the portable terminal delivers indicator update information of the slave processor to the master processor. That is, if the status of the display unit is switched from OFF to ON, the indicator update information is delivered to the master processor irrespective of the indicator update event.

In step 313, the portable terminal sets the PRE_STATUS to ON, and the procedure returns to step 301. Herein, the PRE_STATUS is a parameter that indicates the status of the display unit the last time the indicator update information was transmitted or the last time transmission was attempted. The PRE_STATUS is managed by the slave processor.

If the display unit is switched to OFF in step 303, proceeding to step 315, the portable terminal notifies the slave processor that the status of the display unit is switched to OFF and then the portable terminal proceeds to step 305. Herein, the notification is performed by the master processor.

If the indicator update event occurs in step 305, proceeding to step 317, the portable terminal determines whether the current status of the display unit is ON or OFF. Herein, the current status of the display unit is determined according to the display unit's status which is recently notified from the master processor to the slave processor.

If the current status of the display unit is OFF, proceeding to step 319, the portable terminal sets the PRE_STATUS to OFF, and the procedure returns to step 301. Otherwise, if the current status of the display unit is ON, proceeding to step 311, the portable terminal delivers indicator update information of the slave processor to the master processor. In step 313, the portable terminal sets the PRE_STATUS to ON, and the procedure returns to step 301.

According to exemplary embodiments of the present invention, unnecessary power consumption can be avoided by is discontinuing communication of information displayed on a display unit while a status of the display unit is OFF.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus of a terminal, the apparatus comprising:
   transceiver;
   a display;
   a housing;
   a first processor within the housing operatively coupled with the display; and
   a second processor within the housing configured to generate information regarding strength of a signal received via the transceiver,
   wherein the first processor is configured to:
   display an indicator for indicating an antenna bar based on the information received from the second processor while the display operates in an on state; and
   in response to detecting that the state of the display is switched from the on state to an off state, transmit a signal for indicating that the state of the display is switched to the off state, to the second processor, and
   wherein the second processor is configured to, in response to receiving the signal from the first processor, cease to transmit the information to the first processor, the first processor and the second processor remaining powered on after ceasing transmission of the information to the first processor.

2. The apparatus of claim 1, wherein the first processor is further configured to:
   in response to receiving the information for updating the indicator from the second processor, display the updated indicator on the display.

3. The apparatus of claim 1,
   wherein the first processor is further configured to, in response to detecting that the state of the display is switched from the off state to the on state, transmit another signal for indicating that the state of the display is switched to the on state, to the second processor.

4. The apparatus of claim 1, wherein the second processor is configured to:
   if changing the information is detected, transmit the changed information to the first processor.

5. The apparatus of claim 1, wherein the indicator comprises at least one of registration status, an access status, a short message service cell broadcast (SMSCB), or a service availability status.

6. The apparatus of claim 1, wherein the information comprises information associated with a terminal's location.

7. The apparatus of claim 1, wherein the first processor is configured to support a first communication protocol and the second processor is configured to support a second communication protocol.

8. The apparatus of claim 1, wherein the first processor configured to:
   generate an image data by using the information; and
   provide the image data to the display.

9. The apparatus of claim 1, wherein the indicator is usable for being displayed on the display.

10. A method for operating a terminal, the method comprising:
    generating, via a second processor within a housing of the terminal, information regarding strength of a signal received through transceiver of the terminal;
    displaying, via a first processor within the housing of the terminal, an indicator for indicating an antenna bar based on the information transmitted from the second processor to the first processor while a display of the terminal operates in an on state;
    in response to detecting that the state of the display is switched from the on state to an off state, obtaining, via the first processor, a signal for indicating that the state of the display is switched from the on state to the off state, the signal transmitted from the first processor to the second processor; and
    in response to obtaining the signal, ceasing, via the second processor, to transmit the information to the first processor,
    wherein the display is operatively coupled to the first processor, and
    wherein the first processor is operatively coupled to the second processor, the first processor and the second processor remaining powered on after ceasing transmission of the information to the first processor.

11. The method of claim 10, further comprising:
    in response to obtaining the information for updating the indicator, displaying, via the first processor, the updated indicator on the display,
    wherein the information is transmitted from the second processor.

12. The method of claim 10, further comprising:
    in response to detecting that the state of the display is switched from the off state to the on state, obtaining another signal for indicating that the state of the display is switched to the on state, the another signal transmitted from the first processor to the second processor.

13. The method of claim 10, further comprising:
    if changing the information is detected, transmitting, via the second processor, the changed information to the first processor.

14. The method of claim 10, wherein the indicator is usable for being displayed on the display.

15. The method of claim 10, wherein the indicator comprises at least one of registration status, an access status, a short message service cell broadcast (SMSCB), or a service availability status.

16. The method of claim 10, wherein the first processor is configured to support a first communication protocol and the second processor is configured to support a second communication protocol.

17. The method of claim 10, further comprising:
generating an image data by using the information; and
providing the image data to the display.

18. A non-transitory machine-readable storage device storing instructions that, when executed by one or more processors, cause the one or more processors to perform operations comprising:
generating, via a second processor in a housing, the second processor among the one or more processors, information regarding strength of a signal received through transceiver;
displaying, via a first processor in the housing, the first processor among the one or more processors, an indicator for indicating an antenna bar based on the information transmitted from the second processor to the first processor while a display operates in an on state;
in response to detecting that the state of the display is switched from the on state to an off state, obtaining, via the first processor, a signal for indicating that the state of the display is switched to the off state, the signal is transmitted from the first processor to the second processor; and
in response to obtaining the signal, ceasing, via the second processor, to transmit information to the first processor, the first processor and the second processor remaining powered on after ceasing transmission of the information to the first processor,
wherein the display is operatively coupled to the first processor, and
wherein the first processor is operatively coupled to the second processor.

* * * * *